United States Patent
Stovall et al.

(10) Patent No.: US 11,304,353 B2
(45) Date of Patent: Apr. 19, 2022

(54) CLOSED-LOOP PROPORTIONAL POSITION CONTROL OF AN IMPLEMENT STABILIZER WHEEL

(71) Applicant: CNH Industrial America LLC, New Holland, PA (US)

(72) Inventors: Christopher Stovall, Chicago, IL (US); Kena Shah, Woodbridge, IL (US); Timothy R. Blunier, Danvers, IL (US)

(73) Assignee: CNH Industrial America LLC, New Holland, PA (US)

( * ) Notice: Subject to any disclaimer, the term of this patent is extended or adjusted under 35 U.S.C. 154(b) by 653 days.

(21) Appl. No.: 16/227,411

(22) Filed: Dec. 20, 2018

(65) Prior Publication Data

US 2020/0196513 A1    Jun. 25, 2020

(51) Int. Cl.
*A01B 63/22*      (2006.01)
*F15B 15/28*      (2006.01)
*F15B 11/10*      (2006.01)

(52) U.S. Cl.
CPC .............. *A01B 63/22* (2013.01); *F15B 11/10* (2013.01); *F15B 15/2815* (2013.01); *F15B 2211/41572* (2013.01); *F15B 2211/426* (2013.01); *F15B 2211/455* (2013.01); *F15B 2211/46* (2013.01); *F15B 2211/6656* (2013.01); *F15B 2211/7054* (2013.01); *F15B 2211/7656* (2013.01)

(58) Field of Classification Search
CPC ...... A01B 63/22; F15B 11/10; F15B 15/2815; F15B 2211/41572; F15B 2211/426; F15B 2211/455; F15B 2211/46; F15B 2211/6656; F15B 2211/7054; F15B 2211/7656
See application file for complete search history.

(56) References Cited

U.S. PATENT DOCUMENTS

| | | | |
|---|---|---|---|
| 4,354,688 A | 10/1982 | Swanson | |
| 4,518,044 A * | 5/1985 | Wiegardt et al. | A01B 67/00 172/7 |
| 4,821,806 A | 4/1989 | Winter | |
| 6,058,342 A | 5/2000 | Orbach et al. | |
| 6,129,157 A | 10/2000 | Noonan et al. | |
| 6,164,385 A | 12/2000 | Buchl | |
| 6,382,326 B1 | 5/2002 | Goins et al. | |
| 6,612,375 B2 | 9/2003 | Rogala | |
| 7,543,655 B2 | 6/2009 | Buchl | |
| 8,925,439 B2 | 1/2015 | Greenwood et al. | |

(Continued)

OTHER PUBLICATIONS

Jiangxue, Chang; Research on Hydraulic Suspension Technology of Tractor; Advances in Intelligent Systems Research; 2017; Atlantis Press; vol. 154; pp. 552-555; available at: http://download.atlantis-press.com/php/download_paper.php?id=25883324.

*Primary Examiner* — Thomas B Will
*Assistant Examiner* — Joel F. Mitchell
(74) *Attorney, Agent, or Firm* — Rebecca L. Henkel; Rickard K. DeMille

(57) ABSTRACT

A method and apparatus for remotely positioning a stabilizer wheel of a towable agricultural implement simultaneously, cooperatively and proportionally control the flow of hydraulic fluid to and from both the rod and base ends of the bore of a double-acting hydraulic cylinder, to hold the piston of the hydraulic cylinder at a target position determined from a desired position input signal corresponding to a desired position of the stabilizer wheel with respect to a frame of the agricultural implement.

16 Claims, 7 Drawing Sheets

(56) References Cited

U.S. PATENT DOCUMENTS

| | | |
|---|---|---|
| 10,645,857 B2 * | 5/2020 | Glennon et al. ........ F15B 11/08 |
| 10,820,470 B2 * | 11/2020 | Wu et al. ............ F15B 13/0417 |
| 2016/0212928 A1 | 7/2016 | Wileniec et al. |
| 2016/0212929 A1 | 7/2016 | Wileniec et al. |
| 2018/0220574 A1 * | 8/2018 | Peterson et al. ..... A01B 69/003 |
| 2018/0249622 A1 * | 9/2018 | Sporrer et al. ....... A01B 63/008 |
| 2018/0271020 A1 * | 9/2018 | Kovach ............... B60T 8/17554 |
| 2018/0310459 A1 * | 11/2018 | Blunier ................ A01B 33/087 |
| 2018/0310460 A1 * | 11/2018 | Stovall et al. ....... A01B 79/005 |
| 2019/0116718 A1 * | 4/2019 | Ito et al. ................. F15B 13/02 |
| 2019/0183030 A1 * | 6/2019 | Sporrer et al. ......... A01B 63/22 |

\* cited by examiner

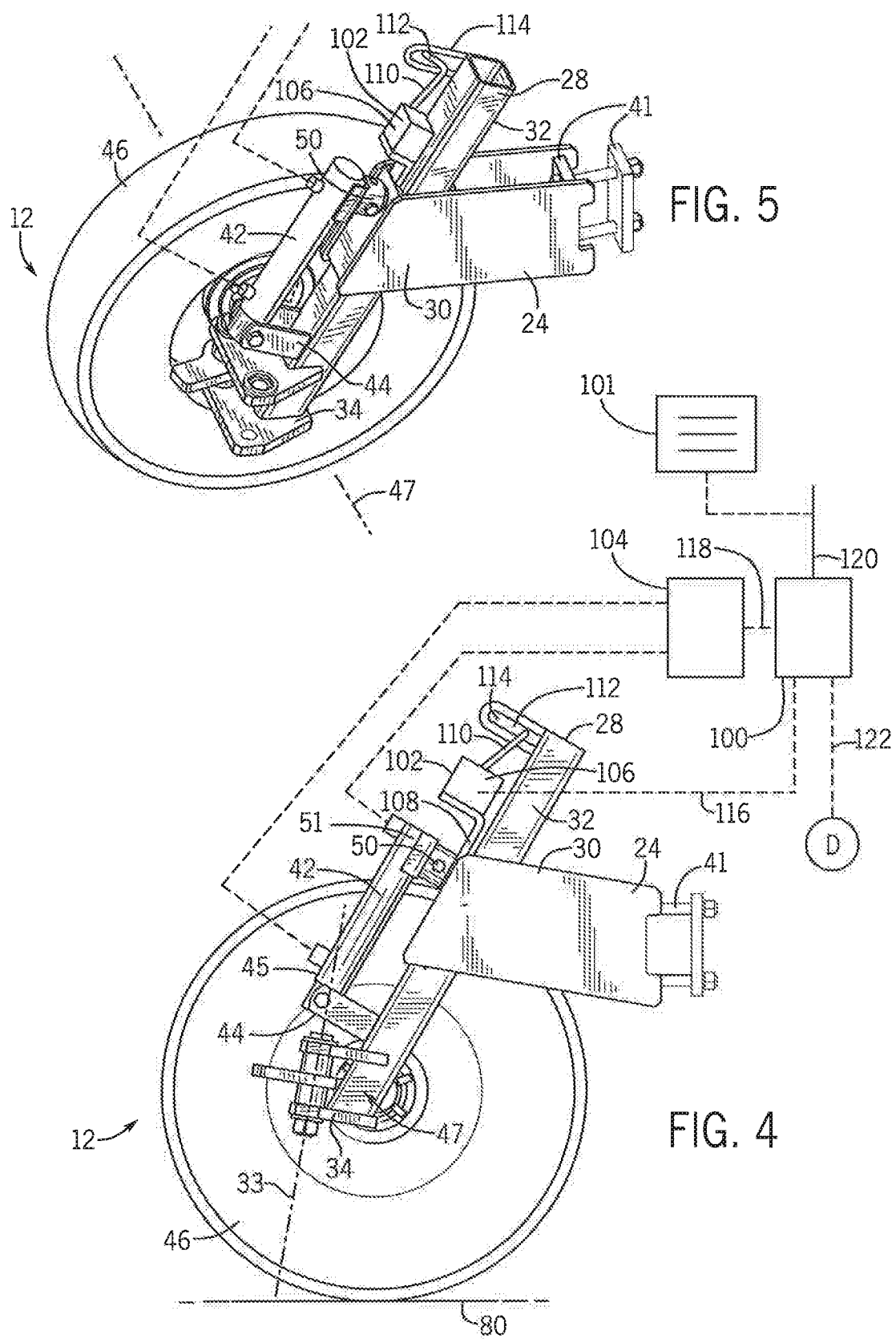

CLOSED-LOOP PROPORTIONAL POSITION CONTROL OF AN IMPLEMENT STABILIZER WHEEL

FIELD OF THE INVENTION

The present invention pertains to towable agricultural implements, such as tillage equipment and other wide implements, towed behind a towing vehicle, such as a tractor, and, more specifically, to actively controlling positioning of stabilizer wheels utilized in such implements during operation of the implement.

BACKGROUND OF THE INVENTION

Modern farming practices often utilize towable agricultural tillage implements to prepare a seedbed providing optimal conditions for subsequent planting of seed in the seedbed, proper germination and growth of the seed, and conservation of the soil in and below the seedbed. Such implements are configured to provide a seedbed having a number of desirable conditions, including a uniform controlled depth, a flat and smooth floor at the bottom of the seedbed, and a relatively even surface finish.

To cover large acreages as quickly and efficiently as possible, modern towable tillage implements, such as disks and field cultivators, are often very wide, with tillage widths of 22 to 47 feet being common. In order to allow such wide implements to be towed behind a towing vehicle on public roadways, these implements typically are built with frames having a central main frame section and multiple wing sections joined to the main frame by hinged joints, so that the wing sections can be folded up over the main frame section to narrow the width of the implement for transport on public roadways. In addition, the frames of such implements are also intentionally built to allow a limited amount of flexing to occur across the width of the implement during tillage operations, so that tillage tools attached to the frame can better follow variations in the terrain of the ground being tilled.

The hinged joints and inherent flexibility between the main and wing sections of the frame of such implements sometimes leads to undesirable bouncing of the wings, or an undesirable tendency of the outer edges of the tillage tools to dig deeper than desired into the ground surface, particularly while turning or maneuvering around obstacles. The wider the implement, the worse this problem becomes.

In order to counteract the tendency of wide tillage implements to undesirably bounce or dig into the ground surface, some tillage implements utilize so-called stabilizer wheels along outer extremities of the implement. These stabilizer wheels ride on or close to the ground surface, to damp any bouncing tendencies, and to provide additional support to preclude having the outer ends of the tillage tools dig too deeply into the ground surface during turning or maneuvering the wide tillage implement around obstacles during tillage operations. To improve maneuverability, such stabilizer wheels are sometimes configured to pivot during turning and maneuvering.

Generally speaking, such stabilizer wheels are properly initially adjusted to bear only lightly on the ground surface, until they come into play for reducing bouncing or digging in of the tillage tools. They do not typically function to provide primary support of the implement or primary depth control for the tillage tools. Primary support and depth control are typically provided by support and transport wheels of the implement. Having the stabilizer wheels properly positioned to bear only lightly on the ground surface typically enhances the ability of pivotable stabilizer wheels to move as desired under forces exerted by the ground surface during turning and maneuvering of the implement.

For proper operation of the implement, it is necessary for the stabilizer wheels to be positioned properly with respect to the implement frame, so that the stabilizer wheels can perform their necessary function without interfering with primary depth control and leveling of the tillage tools fore and aft, and across the width of the implement. If the stabilizer wheels are extended too far, or press too hard against the ground surface, the resulting lifting effect on the implement frame will interfere with proper operation of the tillage tools, and seedbed quality will be degraded. As changes are made to the depth of tillage, therefore, the stabilizer wheels must also be adjusted in a corresponding manner to keep the implement operating optimally.

In addition, it may be desirable to retract the stabilizer wheels during certain tillage operations and under certain operating conditions. It is also typically desirable that the stabilizer wheels be retracted prior to and during initial set up and subsequent adjustments to the operating depth and level or trim condition of the tillage tools. Following such set up and adjustments, the stabilizer wheels must be returned to a proper position and degree of ground pressure.

In the past, positioning of stabilizer wheels has typically been accomplished through the use of manually operated turnbuckles or screw jacks by an operator or an operator's assistant standing on the ground. Alternatively, manually operated hydraulic cylinders have been used to position the stabilizer wheels on some tillage implements.

More recently, automatically remotely controllable hydraulic cylinders have been utilized to position the stabilizer wheels on some tillage implements. Although the introduction of such automated control has provided substantial improvement over traditional manually actuated positioning apparatuses and methods, they have not kept pace with increased needs for accuracy, precision and responsiveness that is desired and needed in positioning the stabilizer wheels of modern tillage equipment.

To fully take advantage of the operational speed and accuracy available in modern tillage equipment, it is desirable to have changes in the position of a stabilizer wheel be incrementally adjustable remotely in very fine increments, allowing very precise and accurate control of the stabilizer wheel position virtually instantaneously to optimize preparation of the seedbed at the high operational speeds at which modern tillage equipment is operated.

It is specifically desirable to provide an approach to positioning stabilizer wheels that can be carried out remotely by an operator seated in the towing vehicle, without the need for the operator to dismount from the towing vehicle, and without having an assistant on the ground. It is also desirable to provide an approach that allows the stabilizer wheels to be automatically, rather than manually, positioned in response to a simple command from an operator in the cab of the towing vehicle. It is further desirable that the stabilizer wheels be automatically adjusted in response to changes in depth of tillage. It is yet further desirable that an improved approach provide capability for remote, automatic and tillage-depth-responsive adjustment of stabilizer wheel position to be carried out on-the-fly, without the necessity for stopping the towing vehicle, or for the vehicle operator's attention to be diverted from overall operation of the towing vehicle to manually adjust stabilizer wheel position.

It is particularly desirable that an improved approach to remotely and automatically positioning a stabilizer wheel be readily adaptable and widely usable with older and present tractors and towing vehicles without monopolizing multiple hydraulic ports and control valves of the towing vehicle, resorting to complex and costly system additions or upgrades, or requiring the use of communication protocols such as the emerging ISOBUS Class 3 which is not currently widely utilized in agricultural equipment.

SUMMARY OF THE INVENTION

The invention provides an apparatus and a method for remotely positioning a stabilizer wheel of a towable agricultural implement more accurately and precisely than was previously possible, by simultaneously, cooperatively and proportionally controlling the flow of hydraulic fluid to and from both the rod and base ends of the bore of a double-acting hydraulic cylinder, to thereby hold the piston of the hydraulic cylinder at a target position determined from a desired position input signal corresponding to a desired position of the stabilizer wheel with respect to a frame of the agricultural implement.

The invention allows multiple stabilizer wheels to be controlled independently from one another, and from a depth control apparatus of the implement. In applications with multiple stabilizer wheels, the invention allows the stabilizer wheels to be moved in opposite directions at the same time. The invention provides the further advantage of positioning one, or multiple stabilizer wheels using only a single source of pressurized hydraulic fluid operating in a standby mode, without the use of multiple hydraulic control channels of a towing vehicle. The invention further provides a significantly greater degree of accuracy and precision in positioning of stabilizer wheels than was previously achievable.

In one form of the invention, a remotely positionable stabilizer wheel arrangement is provided for an agricultural tillage implement having an implement frame supported above a ground surface by implement support wheels operatively connected to the frame by a depth control arrangement.

The stabilizer wheel arrangement includes a stabilizer wheel adapted for engaging the ground surface, a stabilizer wheel positioning arrangement adapted for operatively connecting the stabilizer wheel to the frame of the implement, a position sensor, an electro-hydraulic proportional flow control arrangement, and an electrical controller. The controller may include a processor, a data registry and an input/output arrangement.

The stabilizer wheel positioning arrangement includes a double-acting hydraulic cylinder, and it is configured for adjusting engagement of the stabilizer wheel with the ground surface through action of the double-acting hydraulic cylinder.

The position sensor is operatively connected for indicating a present position of the stabilizer wheel with respect to the frame, and it is configured for generating an electrical present position signal indicative of the present stabilizer wheel position with respect to the frame.

The double-acting hydraulic cylinder of the stabilizer wheel positioning arrangement has an internal bore divided by a piston into a base end and a rod end of the bore. The cylinder also includes first and second ends of the cylinder that are operatively attached within the wheel positioning arrangement for extension and retraction of the wheel positioning arrangement with respect to the frame by corresponding movement of the piston within the bore of the hydraulic cylinder, to thereby position the stabilizer wheel with respect to the frame.

The electro-hydraulic proportional flow control arrangement is adapted for receiving a cylinder control electrical signal, and further adapted for operative connection in fluid communication with a source of pressurized hydraulic fluid for receiving a flow of pressurized hydraulic fluid from the source.

The electro-hydraulic proportional flow control arrangement includes a solenoid-operated proportional flow control valve operatively connected in fluid communication with both the base end and the rod end of the bore of the hydraulic cylinder and configured for simultaneously and cooperatively controlling the flow of hydraulic fluid to and from both the rod and base ends of the bore of the hydraulic cylinder, to thereby control extension and retraction of the cylinder in accordance with the cylinder control signal.

The electrical controller is adapted for receiving an input signal indicating a desired position of the stabilizer wheel with respect to the frame. This desired position signal may be manually supplied by an operator of a towing vehicle pulling the implement, or alternatively be supplied from another control module within the controller or from an external control unit. In some forms of the invention, the desired position signal may be provided in conjunction with a corresponding control capability for adjusting the depth control arrangement of the implement.

The controller is further adapted, operatively connected to the position sensor and the solenoid-operated proportional flow control valve, and it is configured for receiving the present position signal from the position sensor and for generating and providing the cylinder control signal to the solenoid-operated proportional flow control valve. The controller generates the cylinder control signal in response to the present position signal and the desired wheel position signal, to thereby cause the hydraulic cylinder to move the stabilizer wheel to and hold the stabilizer wheel at the desired stabilizer wheel position by simultaneously, cooperatively and proportionally controlling the flow of pressurized hydraulic fluid to and from both the rod and base ends of the bore of the hydraulic cylinder.

The controller may be further configured for modifying the cylinder control signal, prior to sending it to the electro-hydraulic flow proportional control arrangement to compensate for non-linearity of the solenoid-operated proportional flow control valve.

The controller and position sensor may be operatively connected and configured to form a proportional negative feedback control arrangement for determining a present difference between the desired and present positions of the stabilizer wheel and adjusting the flow of hydraulic fluid to and from the rod and cylinder ends of the bore of the cylinder in proportion to the determined present difference between the desired and present positions of the stabilizer wheel to reduce the present difference.

The controller may also be configured for continually sampling the present difference between the desired and present positions of the stabilizer wheel at a periodic rate and commanding the proportional flow control valve to simultaneously and cooperatively adjust the flow of pressurized hydraulic fluid to and from both the rod and base ends of the bore of the hydraulic cylinder at the periodic rate.

In some forms of the invention, the present position of the piston in the cylinder bore, and a target position of the piston in the bore may be utilized for controlling the position of the stabilizer wheel.

In such forms of the invention, the position sensor may be operatively connected for indicating a present position of the piston within the cylinder bore that corresponds to the present position of the stabilizer wheel with respect to the frame, and it is configured for generating an electrical signal indicative of the present position of the piston within the cylinder bore. The controller is configured for determining a target position of the piston within the cylinder bore corresponding to the desired wheel position input signal, and for determining a present difference between the target and present positions of the piston. The controller is further configured for adjusting the flow of hydraulic fluid to and from the rod and base ends of the bore of the cylinder in proportion to the determined present difference between the target and present positions of the piston in the cylinder bore to reduce the present difference. The controller may also be configured for continually sampling the present difference between the target and present positions of the piston within the bore of the cylinder at a periodic rate and commands the proportional control valve to simultaneously and cooperatively adjust the flow of pressurized hydraulic fluid to and from both the rod and base ends of the bore of the hydraulic cylinder at the periodic rate.

In forms of the invention utilizing a target position of the piston within the bore of the double-acting cylinder, the controller may be configured for determining the target position of the piston within the cylinder bore by at least one step from the group of the steps consisting of: (a) selecting a predetermined target position for the piston corresponding to the desired stabilizer wheel position input from a table stored in the controller and controlling the hydraulic control arrangement using the predetermined piston target position; (b) computing a computed desired target position for the piston corresponding to the desired stabilizer wheel position input and controlling the hydraulic control arrangement using the computed desired target position for the piston; and (c) making an incremental adjustment to a previously determined target position for the piston in the cylinder bore.

A solenoid-operated proportional flow control valve, according to the invention, may include an inlet port, a return port, a first cylinder port and a second cylinder port, and at least one electrical solenoid(s), typically implemented as multiple solenoids per valve, configured operatively connected to the controller for receiving the cylinder control signal and controlling a flow of pressurized hydraulic fluid through the proportional flow control valve in accordance with the cylinder control signal. The inlet and outlet ports may be adapted for operative connection in fluid communication to the source of pressurized hydraulic fluid for respectively receiving a flow of pressurized hydraulic fluid from the source of pressurized hydraulic fluid and returning the flow of pressurized hydraulic fluid to the source of pressurized hydraulic fluid. The first and second cylinder ports may be operatively connected in fluid communication with the base and rod ends respectively of the hydraulic cylinder.

In some forms of the invention, the solenoid-operated proportional flow control valve may be a four-way, three-position, solenoid-controlled valve having a straight-through-flow first position, a blocked-flow second position, and a cross-flow third position that are alternatively selectable by operation of the solenoid(s).

An electro-hydraulic proportional flow control arrangement, in some forms of the invention, may include a pilot-operated check valve arrangement operatively connected in fluid communication across the rod and base ends of the cylinder at a location between the cylinder and the solenoid-operated proportional flow control valve. In some forms of the invention, the electro-hydraulic proportional flow control arrangement may include a pressure-sensitive control valve operatively connected in fluid communication across the inlet ports of the solenoid-operated proportional flow control valve at a location between the solenoid-operated proportional flow control valve and the source of hydraulic fluid, and configured for providing a constant flow rate of hydraulic fluid to the solenoid-operated proportional flow control valve at varying pressure differences between the inlet and outlet ports.

The invention may take the form of an agricultural tillage implement, or a method that includes a remotely adjustable stabilizer wheel arrangement, according to the invention.

An agricultural tillage implement according to the invention may have an implement frame supported above a ground surface by implement support wheels operatively connected to the frame by a depth control arrangement, and at least one stabilizer wheel arrangement according to the invention operatively attached to the frame. The position of at least one stabilizer wheel, of the at least one remotely positionable stabilizer wheels, may be proportionally adjustable independently from the position of the implement support wheels and the depth control arrangement. Some forms of an agricultural tillage implement according to the invention may include at least two remotely positionable stabilizer wheel arrangements operatively attached to the frame and configured for proportional adjustment independently from one another.

The invention may take the form of a method for remotely positioning a stabilizer wheel of an agricultural tillage implement having an implement frame supported above a ground surface by implement support wheels operatively connected to the frame by a depth control arrangement, in accordance with a desired position of the stabilizer wheel with respect to the frame.

One form of such a method may include the steps of: (a) operatively connecting the stabilizer wheel to the frame with a stabilizer wheel positioning arrangement including a double-acting hydraulic cylinder having an internal cylinder bore divided by a piston into a base end and a rod end of the bore, the cylinder also having first and second ends thereof operatively attached within the wheel positioning arrangement for extension and retraction of the wheel positioning arrangement with respect to the frame by corresponding movement of the piston within the bore of the hydraulic cylinder to thereby position the stabilizer wheel with respect to the frame; (b) determining a target position for the piston within the cylinder bore that corresponds to the desired position of the stabilizer wheel with respect to the frame; and, (c) simultaneously, cooperatively and proportionally controlling the flow of hydraulic fluid to and from both the rod and base ends of the bore of the hydraulic cylinder to thereby control extension and retraction of the cylinder for moving the stabilizer wheel to, and holding the stabilizer wheel at the desired stabilizer wheel position.

Some forms of a method, according to the invention, may also include: determining a present position of the piston within the cylinder bore; determining a present difference between the target and present positions of the piston within the cylinder bore; and, adjusting the flow of hydraulic fluid to and from the rod and cylinder ends of the bore of the cylinder in proportion to the determined present difference between the target and present positions of the piston in the cylinder bore to move and hold the piston at the target position for the piston within the cylinder bore.

A method according to the invention may further include determining the target position of the piston within the cylinder bore by at least one step from the group of the steps consisting of: (1) selecting a predetermined target position for the piston corresponding to the desired stabilizer wheel position input from a table and controlling the hydraulic control arrangement using the predetermined piston target position; (2) computing a computed desired target position for the piston corresponding to the desired stabilizer wheel position input and controlling the hydraulic control arrangement using the computed desired target position for the piston; and, (3) making an incremental adjustment to a previously determined target position for the piston in the cylinder bore.

Other aspects, objects and advantages of the invention will be apparent from the following detailed description and accompanying drawings.

BRIEF DESCRIPTION OF THE DRAWINGS

For the purposes of illustration, there are shown in the drawings certain embodiments of the present invention. It should be understood, however, that the invention is not limited to the precise arrangements, dimensions, and instruments shown. Like numerals indicate like elements throughout the drawings. In the drawings:

FIG. 4 illustrates a partly schematic orthographic side view of a left remotely positionable stabilizer wheel arrangement, as viewed from the left front corner of FIG. 1, with a hitch of the implement for attachment to a towing vehicle defining the front of the implement, and left and right sides of the implement being as viewed by a person standing at the rear of the implement looking forward toward the hitch, in accordance with an exemplary embodiment of the present invention;

FIG. 5 illustrates an isometric view of a portion of a remotely positionable stabilizer wheel arrangement of FIG. 4, in accordance with an exemplary embodiment of the present invention;

DETAILED DESCRIPTION OF THE INVENTION

Figure 1:
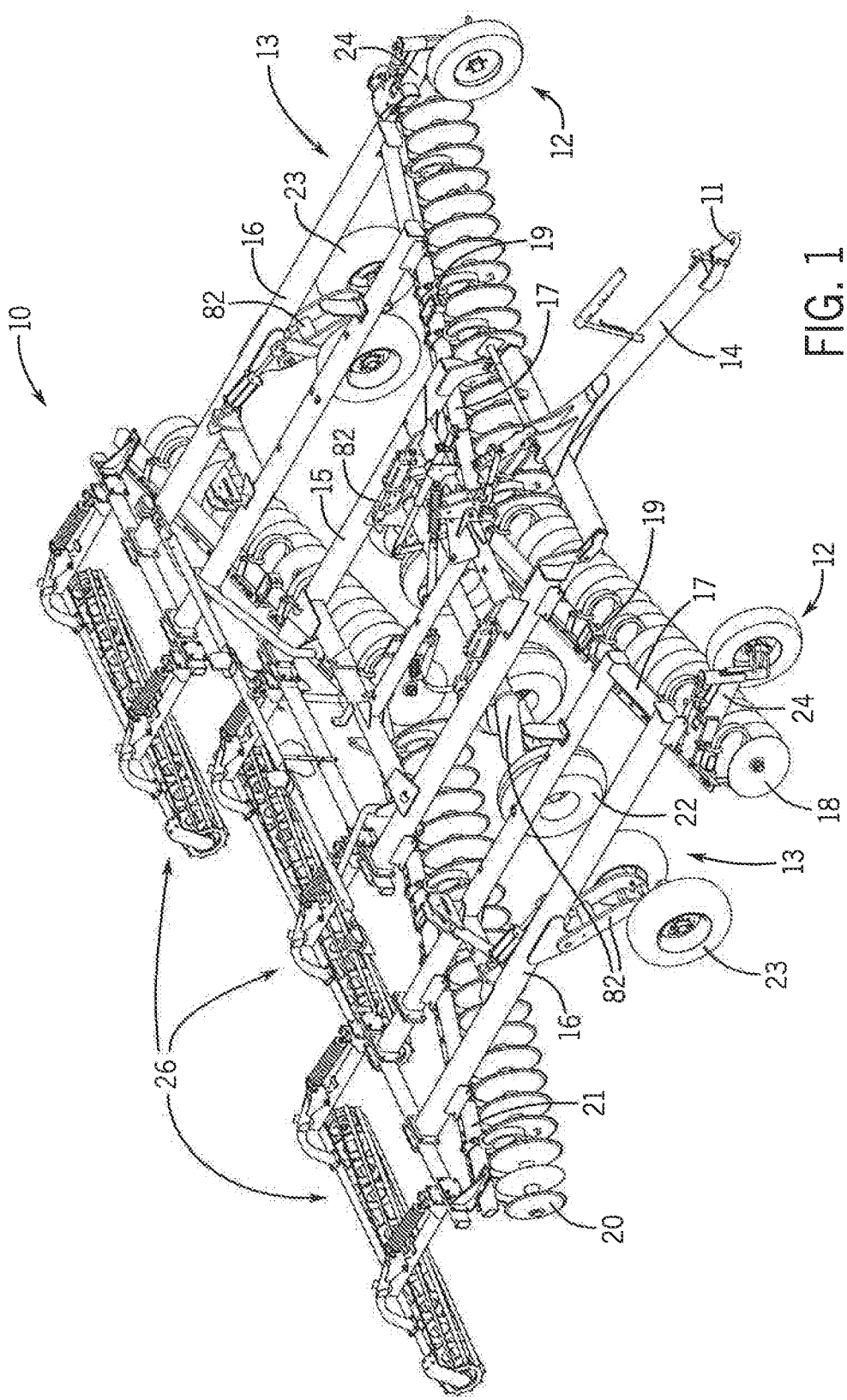
FIG. 1 illustrates an isometric view of an exemplary embodiment of a towable agricultural tillage implement, the towable agricultural tillage implement comprising multiple remotely controllable stabilizer wheel arrangements, in accordance with an exemplary embodiment of the present invention.

FIG. 1 shows an exemplary embodiment of a towable agricultural implement, according to the invention, in the form of a tandem disk 10, including a pair of left and right remotely adjustable stabilizer wheel arrangements 12,12. The disk 10 includes a hitch 14, which has a distal end 11 that is adapted for operative attachment to a towing vehicle, such as a tractor. The disk 10 has a frame 16 that includes a pair of left and right floating wings 13,13 connected to a central main section 15 of the frame 16 by a plurality of hinged joints 19. The disk 10 also includes segmented front and rear tillage tools, in the form of front and rear disk gangs 18, 20, that are operatively joined to the frame 16 by front and rear segmented tool bars 17,21 respectively. The tool bars 17,21 and disk gangs 18,20 are segmented and attached to the main frame 16 and wing frames 13,13 in a manner that allows the wing frames 13,13 and the segments of the front and rear disk gangs 18,20 to be folded above the center section 15 of the frame 16, to thereby narrow the disk 10 for transport on public roadways.

Figure 2:
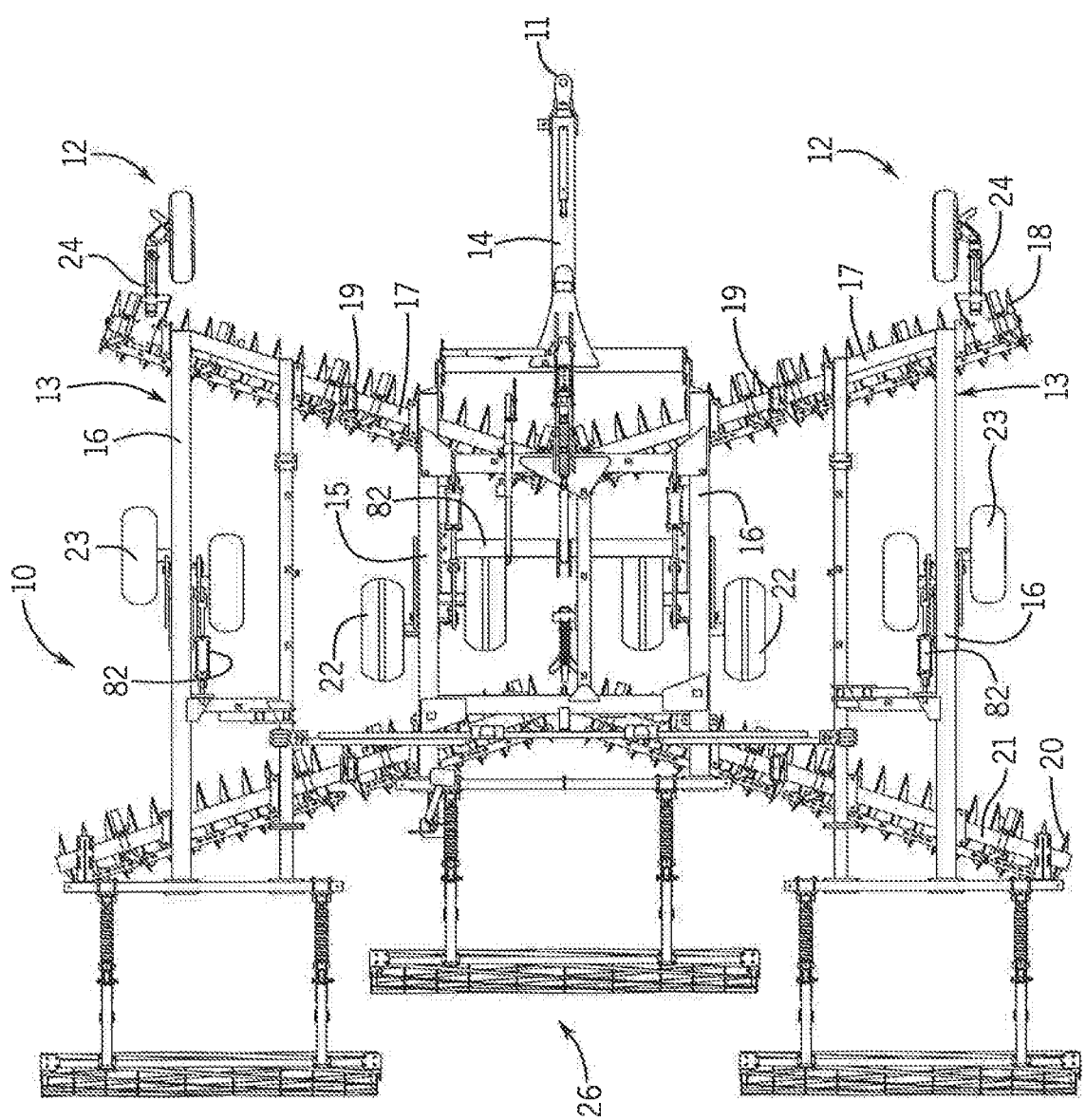
FIG. 2 illustrates an orthographic top view the implement of FIG. 1, in accordance with an exemplary embodiment of the present invention.
Figure 3:
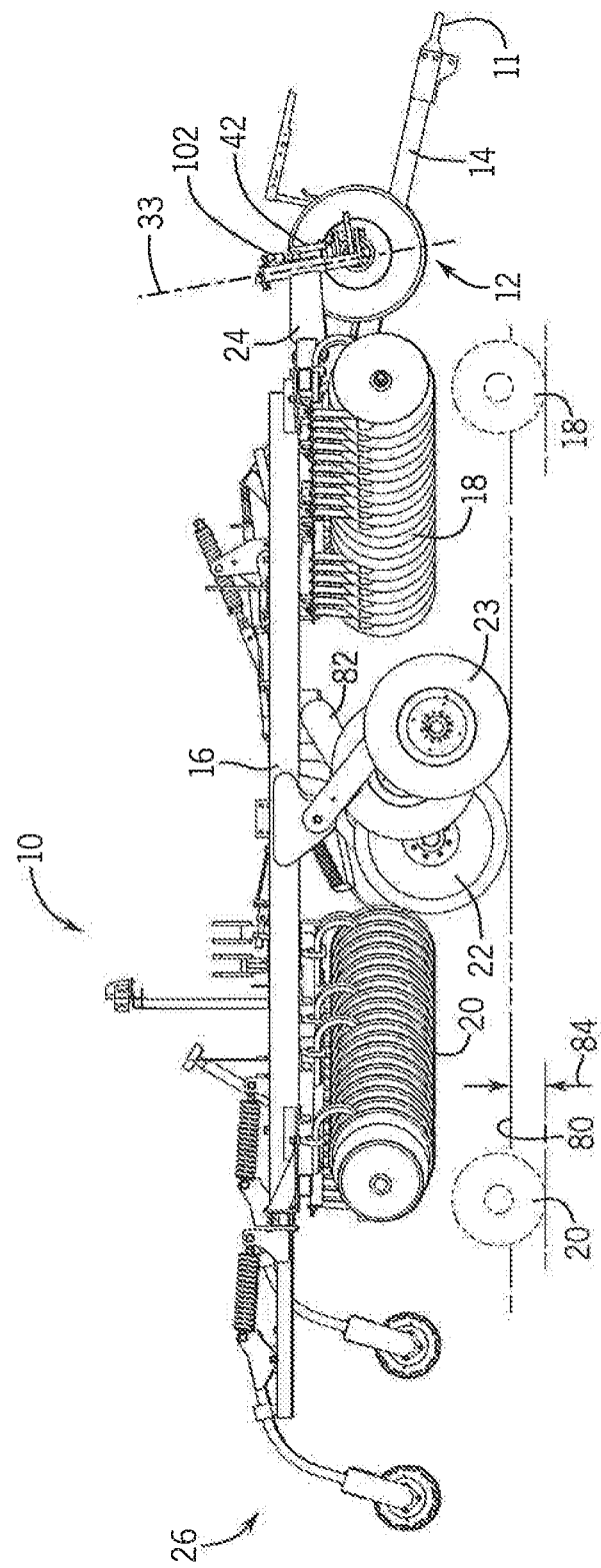
FIG. 3 illustrates an orthographic side view of the implement of FIG. 1, showing the implement in a raised position for field transport, with stabilizer wheels and tillage tools of the implement raised off of the ground, in accordance with an exemplary embodiment of the present invention.

As shown in FIGS. 1-3, the disk 10 is supported above a ground surface 80 by two pairs of tandem support wheels 22,22, and right and left pairs of wing frame support wheels 23,23. The pairs of support and wing frame wheels 22,22, 23,23 are all operatively attached to the frame 16 by a common depth control arrangement 82, in a manner that allows the depth control arrangement 82 to set and maintain a depth of penetration 84 of the tillage tools 18,20 below the ground surface 80, in the manner known in the art, and as indicated schematically in FIG. 3.

Specifically, the depth control arrangement 82 is configured such that, when the wing frames 13 are lowered, as shown in FIGS. 1-3, the support wheels 22,22 and wing frame wheels 23,23 all act together to support the disk 10 above the ground surface 80. In FIG. 3, the disk 10 is shown in a raised, field transport condition, where the wheels 22,22,23,23 and depth control arrangement 82 have lifted the disk gangs 18,20 out of contact with the ground surface 80. When the wing frames 13 are lowered to a working configuration, as shown in FIGS. 1-3, and the depth control arrangement 82 is commanded to lower the disk 10 to a working position, the front and rear gangs 18,20 of tillage tools will penetrate the ground surface 80 to the depth of penetration 84, as indicated by dashed lines in FIG. 3.

The disk 10 and depth control arrangement 82 are further configured such that, when the wing frames 13,13 are raised above the main frame 15 to narrow the disk 10 for towing on a public roadway, a part of the depth control arrangement 82 attaching the transport wheels 22,22 to the main frame 15 is utilized to raise the disk 10 to a transport position, which is not illustrated in the drawings, in a manner known in the art.

As shown in FIGS. 1-3, the exemplary embodiment of the disk 10 also includes surface finishing tools, in the form rotating crumblers 26 operatively attached to the rear of the disk 10.

As best seen in FIGS. 1 and 2, the disk 10 includes two remotely adjustable left and right stabilizer wheel arrangements 12,12 which are respectively located near the left and right front extremities of front tool bar 17. In various embodiments of the invention, the stabilizer wheel arrangements 12,12 may be operatively attached directly to the main frame 15 or wing frames 13 of the frame 16, or alternatively attached to the front tool bar 17

As discussed above, the main frame 15 and wing frames 13,13 are joined together by a plurality of hinged connections 19, that allow the wing frames 13,13 to be folded above the main frame 15. The disk 10 is further configured to utilize these hinged connections 19 in a manner that allows the wing frames 13,13 to flex with respect to the main frame 15, so that the disk gangs 18,20 can better follow the terrain and conform to the ground surface 80, as the disk 10 is towed across the ground surface 80 during tillage operations. This flexibility of the disk frame 16, together with the extensive width of modern tillage implements (22 to 47 feet of width being commonplace) can cause the wings 13,13 to bounce, under certain tillage conditions, and also contribute to the outer corners of the front disk gangs 18,20 undesirably digging too deeply into the ground surface 80, during turning or maneuvering the disk 10 around an obstacle. Accordingly, the remotely positionable stabilizer wheel arrangements 12,12 of the exemplary embodiment of the disk 10 are advantageously attached to the wing frames 13,13, or the front tool bar 17 near the front left and right front corners of the disk 10. Positioning the remotely positionable stabilizer wheel arrangements 12,12 in this manner maximizes their effectiveness in damping out wing bounce and/or undesirable digging-in of the front disk gang 18.

The stabilizer wheel arrangements 12,12 are properly adjusted to maintain only light contact pressure with the ground surface 80, until they come into operation due to a change in the terrain, so as to not interfere with operation of the depth control arrangement 82 and support and transport wheels 23,23,22,22 in maintaining a desired depth of penetration 84 of the front and rear disk gangs 18,20 below the ground surface 80. The stabilizer wheel arrangements 12,12 of the exemplary embodiment are also pivotable by interaction with the ground surface 80, to enhance overall maneuverability and operation of the disk 10. Having a light contact pressure aids in proper pivoting motion of the wheel arrangements 12,12.

FIGS. 4-7 illustrate an exemplary embodiment of the remotely hydraulically positionable stabilizer wheels 12, 12, of the exemplary embodiment of the disk 10. The left and right remotely positionable stabilizer wheel arrangements 12,12 of the exemplary embodiments described herein are left and right-hand assemblies of identical groupings of component parts.

FIGS. 4 and 5 show the left front remotely positionable stabilizer wheel arrangement 12 of the disk 10. The exemplary embodiment of the remotely positionable stabilizer wheel arrangement 12 includes a support strut 28, a support strut bracket 24, a stabilizer wheel 46, a double-acting hydraulic cylinder 42, an electro-hydraulic control arrangement 104, a stabilizer wheel position sensor 102, and an electronic control unit 100. The support strut 28, the support strut bracket 24 and the double-acting cylinder 42 are part of a stabilizer wheel positioning arrangement 29, that is adapted and configured for adjustably connecting the stabilizer wheel 46 to the frame 16, in a manner described in more detail below.

The support strut 28 has a first, lower, end 34 thereof adapted for mounting the stabilizer wheel 46 to the support strut 28 in a manner that allows the stabilizer wheel 46 to roll about a substantially horizontal rotational axis 47 when the stabilizer wheel 46 is in contact with the ground surface 80. The lower end of the support strut 28 is configured to form a pivot bracket 34, and it is connected to the stabilizer wheel 46 in a manner that allows the wheel 46 to pivot to a limited degree about a pivot axis 33 that extends in a generally up and down, non-horizontal direction, to thereby facilitate pivoting of the stabilizer wheel 46 and maneuverability of the disk 10.

The support strut bracket 24 has a first end 41 thereof adapted for attachment to the implement frame 16, or the front tool bar 17. In the embodiments shown in FIGS. 4-5 and 8-9, the first end 41 of the support strut bracket is configured as a bolt-on clamping arrangement. In other embodiments, the first end 41 of the support strut bracket 24 may be configured for attachment by any appropriate method, such as a through a bolting flange or by welding. The second, distal, end 30 of the support strut bracket 24 is configured for slidable engagement with a second end 32 of the support strut 28, in a manner allowing the stabilizer wheel 46 to alternatively be lowered into contact the ground surface 80, or raised out of contact with the ground surface 80.

A first, lower, end 45 of the hydraulic cylinder 42 is operatively attached to a pair of ears 44 of the pivot bracket 34 at the lower end of the support strut 28 by a pivoting pin or bolted connection. The other, upper, end thereof of the hydraulic cylinder 42 is operatively attached through a pivotable pinned or bolted connection to a second pair of ears 50 fixedly attached to the second end 30 of the support strut bracket 24. By virtue of this arrangement, the support strut 28 can be extended or retracted with respect to the strut bracket 24 by corresponding extension and retraction of the hydraulic cylinder 42, to thereby respectively lower and raise the stabilizer wheel 46 into, and out of contact with the ground surface 80.

As shown in FIGS. 4 and 5, the position sensor 102, of the remotely positionable stabilizer wheel arrangement 12 is operatively connected between the strut 28 and the strut bracket 24 for indicating a present linear position of the strut 28 with respect to the strut bracket 24, and for generating an electrical signal 116 that is indicative of a present position of the stabilizer wheel 46 with respect to the strut bracket 24. In the embodiment shown in FIGS. 4 and 5, the position sensor 102 is a rotary potentiometer, having a body 106 attached to a sensor mounting bracket 108 that extends upward from and is fixedly attached to the second end 30 of the support strut bracket 24. The rotary potentiometer 102 has a rotatable arm 110 thereof, that slidingly engages an elongated slot 112 in a guide bracket 114 that is affixed to the upper end 32 of the strut 28, in such a manner that linear movement of the strut 28 with respect to the strut bracket 24 is translated into rotation of the arm 110 of the potentiometer 102 with respect to the body of potentiometer 102, to thereby cause the potentiometer 102 to generate the electrical signal 116 indicating a present position of the stabilizer wheel 46 with respect to the strut bracket 24.

It will be appreciated that once the present position of the stabilizer wheel 46 with respect to the strut bracket 24 is known, it is a matter of straightforward geometric calculation, using the dimensions of the disk 10 and the current depth of penetration being held by the depth control arrangement 82, to also determine contact, or lack of contact, of the stabilizer wheel 46 with the ground surface 80. It will also be appreciated that, in other embodiments of the invention, the position sensor 102 may take a variety of different forms, and it may utilize sensing elements other than a rotary potentiometer. For example, it is contemplated that other embodiments of the invention may utilize some form of a linear position sensor operatively connected between the strut 28 and the strut bracket 24, or a Hall-effect or other type of cylinder rod extension sensor 103 (see FIGS. 6 and 7) built into the hydraulic cylinder 42.

As illustrated schematically in FIG. 4, the hydraulic control arrangement 104 is operatively connected to the hydraulic cylinder 42 for controlling extension and retraction of the cylinder 42 in response to cylinder control rod-end and base-end electrical signals 118,119 received from the electronic control unit 100. It is contemplated that the hydraulic control arrangement 104 may take the form of any suitable electrically controlled source of hydraulic power, available as a part of the disk 10 or in the towing vehicle. The invention provides a particular advantage, however, when the control unit 100 is mounted on the implement 10, in that interconnections and communication between the towing vehicle and the disk are simplified to the point that more complex communication and controls such as ISOBUS Class 3 are not required.

As further illustrated schematically in FIG. 4, the electronic control unit 100, of the remotely positionable stabilizer wheel arrangement 12, is further operatively connected to the position sensor 102 to receive the present stabilizer wheel position signal 116 from the position sensor 102. As further illustrated schematically in FIG. 4, the electronic control unit 100 is configured to also receive a desired stabilizer wheel position input 120 from an external source, such as a command from an operator of the towing vehicle, inputted through a touchscreen 101 or other input device located in the cab of the towing vehicle. The electronic control unit 100 is internally configured for providing the cylinder control electrical signals 118,119 to the hydraulic control arrangement 104, to thereby cause the hydraulic cylinder 42 to move the stabilizer wheel 46 to, and hold the stabilizer wheel 46 at a present stabilizer wheel position, as indicated by the position signal 116 generated by the position sensor 102, that is equal to the desired stabilizer wheel position input 120 received from the external source, or operator input.

In some forms of a remotely positionable stabilizer wheel arrangement 12, according to the invention, the control unit 100 selects a predetermined stabilizer wheel position, stored in memory of the control unit 100, corresponding to the desired stabilizer wheel position input 120 and controls the hydraulic control arrangement 104 using the predetermined stabilizer wheel position. In other forms of the invention, the control unit 100 may calculate a computed desired stabilized wheel position corresponding to the desired stabilizer wheel position input 120, and it may control the hydraulic control arrangement 104 using the computed desired stabilizer wheel position. For example, where the control input 120 calls for desired extension of 24 inches of the stabilizer wheel 46 with respect to the strut bracket 24, the electronic control unit will either look up a desired extension position signal 116 stored in memory, or calculate a desired present position signal 116, and then issue appropriate commands 118,119 to the hydraulic power supply 104 to cause the hydraulic cylinder 42 to drive the stabilizer wheel 46 to, and hold the stabilizer wheel 46 at a position of 24 inches, whereat the present position signal 116 matches the desired position signal 120. If a new desired position input of 23 inches is provided, the above processes would be repeated to position the stabilizer wheel 46 at the new position desired present position of 23 inches.

In some forms of the invention, the electronic control unit may be configured to position the stabilizer wheel 46 in response to a desired stabilizer wheel position input signal 120 calling for an incremental adjustment to a previous desired stabilizer wheel position. For example, where the remotely positionable stabilizer wheel 46 is currently operating at extension distance of 24 inches from the strut bracket 24, the input signal 120 may call for the extension distance to be increased by ½ inch from the present position, causing the electronic control unit 100 to calculate a new desired extension position of the stabilizer wheel at 24½ inches from the strut bracket 24, and control the hydraulic power unit 104 to drive the stabilizer wheel 46 to, and hold the stabilizer wheel 46 at an extension of 24½ inches.

As illustrated schematically in FIG. 4, in some forms of a remotely positionable stabilizer wheel arrangement 12, according to the invention, the electronic control unit 100 may be yet further configured for receiving a desired depth electrical signal 122 and computing a computed desired position of the stabilizer wheel 46, and for providing a cylinder control signal 118 corresponding to the computed desired position of the stabilized wheel to the hydraulic power unit 104, to thereby cause the hydraulic cylinder 42 to move the stabilizer wheel 46 to, and hold the stabilizer wheel 46 at the computed desired stabilizer wheel position corresponding to the desired depth signal 122. The electronic control unit 100 may be configured for selecting a predetermined stabilizer wheel position corresponding to the desired depth electrical signal 122, and for controlling the hydraulic control arrangement 104 using the selected predetermined stabilizer wheel position. In some forms of the invention, the control unit 100 may calculate a computed desired stabilizer wheel position corresponding to the desired depth input 122, and it may control the hydraulic control arrangement 104 using the computed desired stabilizer wheel position. The desired depth input 122 may indicate the desire to make an incremental adjustment to a previous desired depth of penetration 84, in some embodiments of the invention.

In embodiments of the invention utilizing a desired depth signal 122, it is contemplated that the desired depth signal 122 may be an input from a source such as an operator of the towing vehicle, or may alternatively, in some embodiments of the invention, be generated from sensors operating as part of a depth control arrangement 82, or otherwise incorporated into an embodiment of a towable tillage implement 10 according to the invention.

As indicated above, in the exemplary embodiment of the disk 10, the left and right remotely positionable stabilizer wheel arrangements 12,12, according to the invention, the first end 34 of the stabilizer wheel strut 28 is configured as a pivot bracket 34 for operatively connecting the stabilizer wheel 46 to the strut 28. The pivot bracket 34 defines a substantially horizontally extending rolling axis 47 of the stabilizer wheel 46, and also defines a non-horizontal pivot axis 33 of the stabilizer wheel 46, in such a manner that the stabilizer wheel 46 can simultaneously rotate about the rolling axis 47 and pivot about the pivot axis 33, to thereby facilitate maneuvering of the disk 10.

Figure 6:
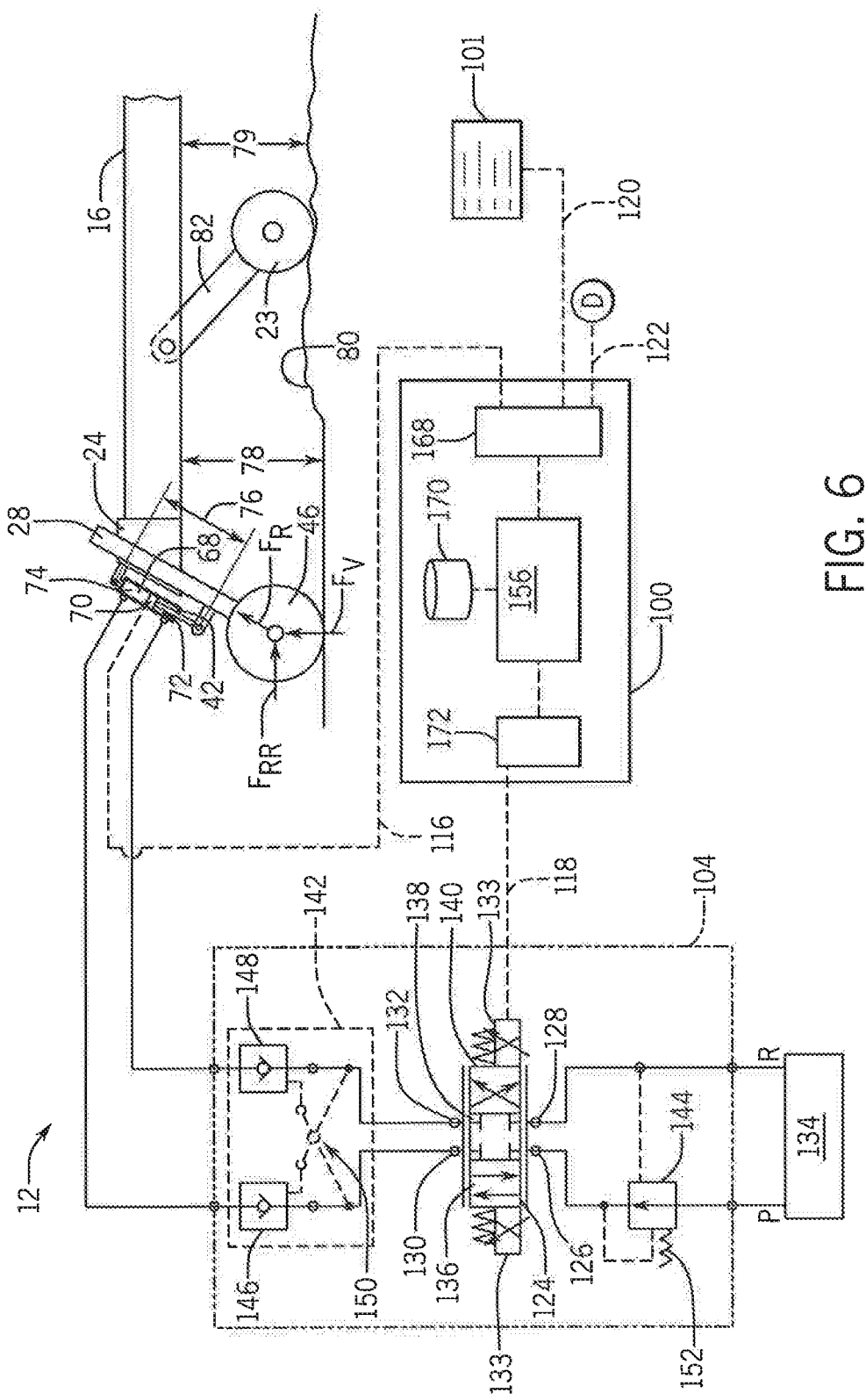
FIG. 6 illustrates a schematic view showing salient aspects of the configuration, interconnection and operation of a control unit and a hydraulic control unit of the remotely positionable stabilizer wheel arrangement of FIGS. 4 and 5, in accordance with an exemplary embodiment of the present invention.
Figure 7:
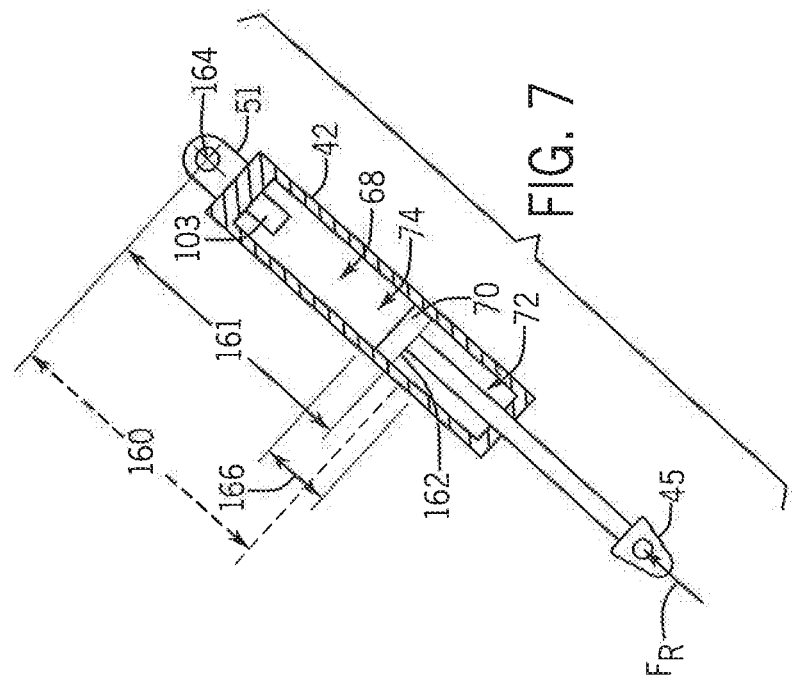
FIG. 7 illustrates an enlarged, cross-sectional view of a hydraulic cylinder of the remotely positionable stabilizer wheel arrangement of FIGS. 4-6, in accordance with an exemplary embodiment of the present invention.

As shown in FIGS. 6 and 7, the hydraulic cylinder 42 of the exemplary embodiment is a double-acting hydraulic cylinder 42 having an internal bore 68 that is divided by a piston 70 into a rod end 72 and a base end 74 of the bore 68. The cylinder 42 also has a first end 45 thereof operatively attached to the support strut 28, and a second end 51 thereof operatively attached to the support strut bracket 24 for extension and retraction of the strut 28 with respect to the strut bracket 24 by corresponding extension and retraction of the hydraulic cylinder 42 to thereby lower and raise the stabilizer wheel 46 into and out of contact with the ground surface 80.

As will be understood from an examination of FIGS. 4-6, in light of the description above, the position sensor 102 (or 103) is operatively connected for indicating a present linear extension 76 of the cylinder 42, which is directly proportional to the position of the strut 28 and stabilizer wheel 46 with respect to the strut bracket 24, and generates an electrical signal 116 indicative of a present stabilizer wheel position 78 with respect to the frame 16. When the stabilizer wheel 46 is engaging the ground surface 80, the present stabilizer wheel position 78 is essentially equal to the distance from the strut bracket 24 to the ground surface 80. Furthermore, because the strut bracket 24 is fixedly attached to the frame 16, the electrical signal 116 is also representative of the present position of the stabilizer wheel 46 with respect to the frame 16.

As shown in FIGS. 4-7, the hydraulic control arrangement 104 is operatively connected to both the base end 74 and the rod end 72 of the bore 68 of the hydraulic cylinder 42 for controlling extension and retraction of the cylinder 42 in response to a cylinder control electrical signal 118.

In the embodiment shown in FIG. 5, the control unit 100 is operatively connected to the position sensor 102 and to the hydraulic control arrangement 104, to receive the present position signal 116 from the position sensor 102 and a desired stabilizer wheel position input 120.

In the embodiments shown in FIGS. 6 and 7, the cylinder 42 includes an internal position sensor 103 that is used instead of the position sensor 102, for detecting the present position 160 of the piston 70 in the bore 68 of the cylinder 42 and generating the present position signal 116.

In some embodiments of the invention, the desired stabilizer wheel position input 120 is used by the control unit 100 to select or compute a target stabilizer wheel position 78, or a desired cylinder extension position 76.

As indicated in FIG. 7 and with background reference to FIG. 6, in other embodiments of the invention, the desired stabilizer wheel position may 78 (FIG. 6) or cylinder extension 76 (FIG. 6) may constitute a desired target position 161 for a feature such as the rod end face 162 of the piston 70 within the bore 68 of the cylinder 42, for use by the control unit 100 (FIG. 6) in positioning and holding the stabilizer wheel 46 (FIG. 6) at a desired target position 160, as monitored by the position sensor 103 within the cylinder 42, or by another appropriate position sensor.

The control unit 100 is further configured for providing the cylinder control electrical signal 118 to the hydraulic control arrangement 104, to thereby cause the hydraulic cylinder 42 to move the stabilizer wheel 46, and to hold the stabilizer wheel 46 at the target position equating to the desired stabilizer wheel position 78. The controller 100 may also be configured for commanding the hydraulic control arrangement 104 to move the piston 70 in the cylinder bore 68 any time that the target position present position 161 deviates from the target position 160 by an amount greater than a predetermined tolerance band 166 centered about the desired target position 160.

In the exemplary embodiment of the disk 10, the control unit 100 is configured to hold the stabilizer wheel 46 at the selected or computed target position 160 by simultaneously, cooperatively and proportionally controlling flow in to and out of both the rod and base ends 72,74 of the bore 68 of the hydraulic cylinder 42.

As shown in FIG. 6, the hydraulic control unit in the exemplary embodiment of the disk 10 takes the form of an electro-hydraulic proportional flow control arrangement 104 includes a solenoid-operated proportional flow control valve 124 operatively connected in fluid communication with both the base end 74 and the rod end 72 of the bore 68, of the hydraulic cylinder 42. As described in more detail below, the solenoid-operated proportional flow control valve 124 is configured for simultaneously and cooperatively controlling the flow of hydraulic fluid to and from both the rod and base ends 72,74 of the bore of 68 the hydraulic cylinder 42, to thereby control extension and retraction of the cylinder 42 in accordance with the cylinder control signal 118.

With continued reference to FIG. 6, the solenoid-operated proportional flow control valve 124 of the exemplary embodiment includes inlet port 126, a return port 128, a first cylinder port 130 and a second cylinder port 132, and at least one electrical solenoid(s) 133, typically implemented as multiple solenoids 133 per valve 124, that is configured and operatively connected to the controller 100 for receiving the cylinder control signal 118 and controlling a flow of pressurized hydraulic fluid through the proportional flow control valve 124 in accordance with the cylinder control signal 118. The inlet and outlet ports 126,128 may be adapted for operative connection in fluid communication to a source 134 of pressurized hydraulic fluid, such as a hydraulic fluid supply channel of a tractor or other towing vehicle, for respectively receiving a flow of pressurized hydraulic fluid from the source 134 of pressurized hydraulic fluid and returning the flow of pressurized hydraulic fluid to the source 134 of pressurized hydraulic fluid 134. The first and second cylinder ports 130,132 are operatively connected in fluid communication with the base and rod ends 74,72 respectively of the hydraulic cylinder 42.

The solenoid-operated proportional flow control valve 124 of the exemplary embodiment is a four-way, three-position, solenoid-controlled valve having a straight-through-flow first position 136, a blocked-flow second position 138, and a cross-flow third position 140 that are alternatively selectable by operation of the solenoid(s) 133.

As further illustrated in FIG. 6, the electro-hydraulic proportional flow control arrangement 104 of the exemplary embodiment also includes a double pilot-operated check valve arrangement 142, and a pressure-sensitive control valve 144.

The double pilot-operated check valve arrangement 142 is operatively connected in fluid communication across the rod and base ends 72,74 of the cylinder 42 at a location between the cylinder 42 and the solenoid-operated proportional flow control valve 124. As indicated by the valve schematic in FIG. 6, the double pilot-operated check valve arrangement 142 includes first and second check valve elements 146,148.

The first check valve element 146 is configured and operatively disposed in fluid communication to block flow out of the base end 74 of the cylinder 42 whenever the proportional control valve 124 is in its second position 138. In similar fashion, whenever the proportional control valve 124 is in its second position 138 and blocking flow to either the rod or base ends 72,74 of the cylinder 42 the second check valve element 148 is configured and operatively disposed in fluid communication to block flow out of the rod end 72 of the cylinder 42. As a result, whenever the proportional control valve 124 is in its second position 138 and blocking flow to either the rod or base ends 72,74 of the cylinder 42, the first and second check valve elements 146,148 of the double pilot-operated check valve arrangement 142 remain seated and serve to substantially block flow from entering or exiting the cylinder 42, thereby locking the cylinder 42 in place.

When the solenoid(s) 133 moves the solenoid-operated flow control valve 124 to either of its first or second positions 136,140, pressure is applied to one or the other of the first and second check valve elements 146,148. The check valve element 146,148 receiving the pressurized fluid will open and allow fluid flow to the cylinder 42. As pressure builds on the open check valve element, a cross-connected internal pilot mechanism 150 within the double pilot-operated check valve arrangement 142 directs pressure to the other check valve element, causing the other check valve element to open and allow return flow out of the cylinder 42 to the source 134 of pressurized hydraulic fluid.

As further shown in FIG. 6, an optional pressure-sensitive control valve 144 of the exemplary embodiment is operatively connected in fluid communication across the inlet and outlet ports 126,128 of the solenoid-operated proportional flow control valve 124, at a location between the solenoid-operated proportional flow control valve 124 and the source of hydraulic fluid 134, and is configured for providing a constant flow rate of hydraulic fluid to the solenoid-operated proportional flow control valve 124 at varying pressure differences between the inlet and outlet ports 126,128 of the solenoid-operated proportional flow control valve 124.

The pressure-sensitive control valve 144 of the exemplary embodiment is configured such that anytime the pressure at the inlet port 126 of the solenoid-operated proportional flow control valve 124 exceeds the sum of the pressure at the outlet port 128 of the solenoid-operated proportional flow control valve 124 and a pre-selected bias pressure exerted by a spring 152 of the pressure-sensitive control valve 144, the valve 144 begins to open and allow a portion of the inlet pressure and flow to short-circuit back to the source of pressurized fluid 134, to thereby stabilize flow through the solenoid-operated proportional flow control valve 124.

As will be understood and appreciated by those having skill, from the description of exemplary embodiments herein, practice of the invention provides an apparatus and method for positioning one or multiple stabilizer wheels using only a single source of pressurized hydraulic fluid 134 operating in a standby mode, without the use of multiple hydraulic control channels of a towing vehicle. A remotely positionable stabilizer wheel arrangement 12, according to the invention is essentially self-contained, with regard to the hydraulic system, and does not rely on any control valves within the towing vehicle for positioning a stabilizer wheel 46 with respect to the frame 16 of the implement 10. In addition, advanced control methodologies such as the emerging ISOBUS Class 3 are not required.

As yet further shown in FIG. 6, the controller 100 includes a processor 156 operatively connected in communication with an upstream input/output (I/O) interface 168, a data storage device 170, and an output signal conditioning interface 172. The upstream I/O interface 168 receives the present position signal 116 from the position sensor 103 (or 102), the desired position signal 120, and in some embodiments also a present or desired depth signal D from the depth control arrangement 82 of the disk 10. In the embodiment shown in FIG. 6, the desired depth control signal 120 is illustrated as being received from the touchscreen 101.

The processor 156 may take any appropriate from, including a microprocessor or CPU module or arrangement. The upstream I/O interface 168 provides a mechanism for conveying real-time information from the processor 156 controller 100 to an operator in the cab of the tractor towing the disk 10, and for receiving real-time information from the position sensor 103, from an operator in the cab, or from the depth control arrangement 82, and converting that information into electrical signals that are usable by the processor 156.

The upstream I/O interface 168 may, for example, provide a signal to the touchscreen 101 that allows the touchscreen 101 to visually display values of present and desired depth, or control options for one or more stabilizer wheel arrangements 12 that are operatively connected to be controlled by the controller 100.

The data storage device 170 may be any appropriate form of volatile or non-volatile magnetic or solid-state storage device for receiving and exchanging pre-programmed data, and/or an updateable control program for positioning and controlling the stabilizer wheel arrangement 12, in an internal memory structure of the storage device 170. The internal memory structure of the storage device 170 may be a non-volatile memory array such as Flash memory, for example.

The output signal conditioning interface is configured to provide any post-processing required to modify the cylinder control signal 118 before it is sent to the solenoid(s) 133 of the solenoid-operated proportional control valve 124 of the electro-hydraulic control arrangement 104.

From the foregoing description, it will be appreciated that the controller 100 and the position sensor 103 (or 102) are operatively connected and configured to form a proportional negative feedback control arrangement for determining a present difference $\Delta P$ between the desired position PD (120) and present position PP (78) of the stabilizer wheel 46, and adjusting the flow of hydraulic fluid to and from the rod and cylinder ends 72,74 of the bore 68 of the cylinder 42 in proportion to the determined present difference $\Delta P$ between the desired and present positions PD,PP of the stabilizer wheel 42.

Figure 8:
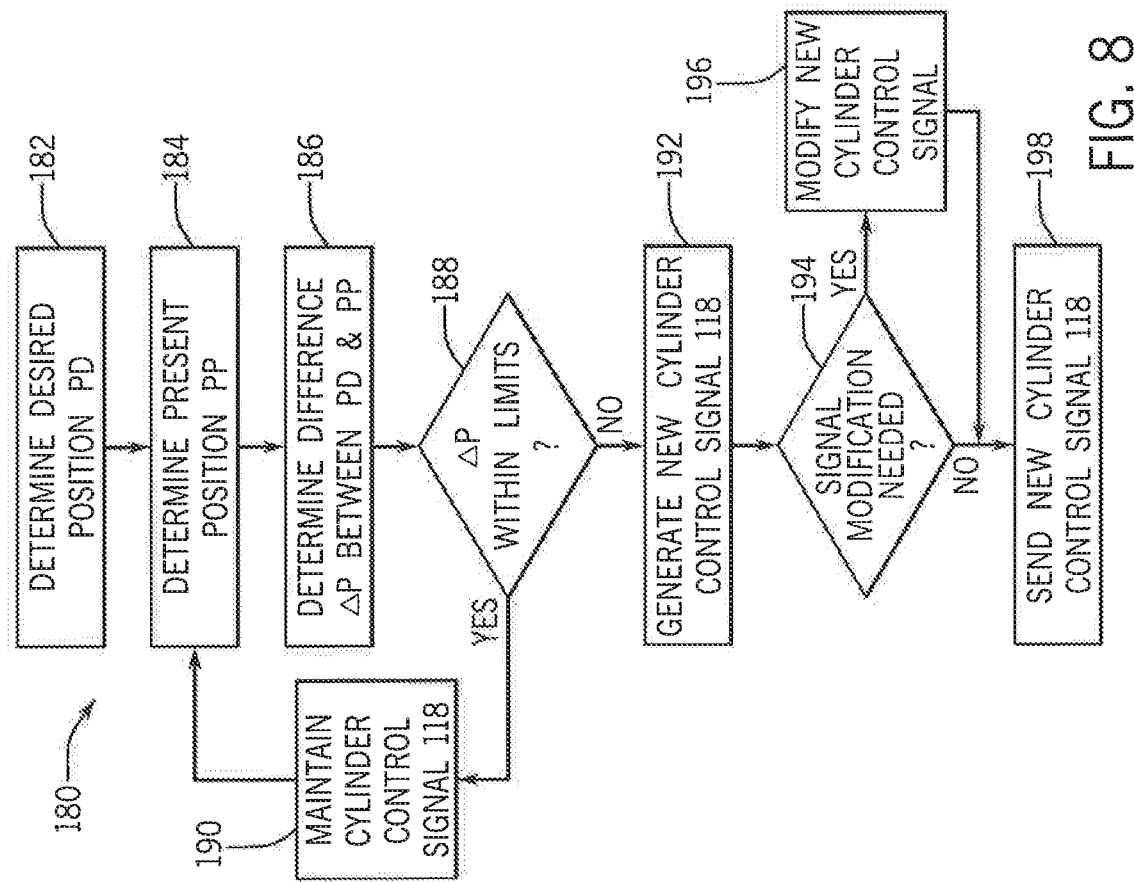
FIG. 8 illustrates a flow diagram showing a method for operating a remotely controllable stabilizer wheel arrangement, in accordance with an exemplary embodiment of the present invention.

FIG. 8 illustrates a process used by the exemplary embodiment of the remotely positionable stabilizer wheel arrangement 12 for commanding the proportional control valve 124 to simultaneously, cooperatively and proportionally adjust the flow of pressurized hydraulic fluid to and from both the rod and base ends 72,74 of the bore 68 of the hydraulic cylinder 42, to thereby cause the hydraulic cylinder 42 to move the stabilizer wheel 46 to, and hold the stabilizer wheel 46 at the desired stabilizer wheel position PD.

As shown at block 182 the process 180 begins with the controller 100 receiving the desired position signal 120 from the touchscreen 101, or the desired depth signal D from the depth control arrangement 82, and determining the desired position PD. As shown at block 184, the controller 100 then determines the present position PP from the present position signal 116 generated by the position sensor 103 (or 102).

The processor 156 then compares the present position PP to the desired position PD, and it determines the difference $\Delta P$ between the desired and present positions PD,PP, as shown at block 186. As shown at decision block 188, the processor 156 then determines whether the determined difference $\Delta P$ falls within acceptable limits. If $\Delta P$ is within acceptable limits, the previous value of the cylinder control signal 118 is maintained, as shown at block 190, and the process 180 returns to block 184. If $\Delta P$ is not within acceptable limits, the process 180 moves on to block 192 and the processor 156 determines a new value for the cylinder control signal 118 that will cause the proportional control valve 124 to simultaneously, cooperatively and proportionally adjust the flow of pressurized hydraulic fluid to and from both the rod and base ends 72,74 of the bore 68 of the hydraulic cylinder 42, to thereby cause the hydraulic cylinder 42 to move the stabilizer wheel 46 to, and hold the stabilizer wheel 46 at the desired stabilizer wheel position PD.

In various embodiments of the invention, the processor 156 may employ different methodologies for determining the new value for the cylinder control signal 118. For example, in some embodiments, the processor 156 may be configured for determining the target position 160 of the piston 70 within the cylinder bore 68 by selecting a predetermined target position 160 for the piston 70 that corresponds to the desired stabilizer wheel position input PD from a table stored in the data storage device 170, and generating the new cylinder control signal 118 from the predetermined piston target position 160 selected from the table. Alternatively, the processor 156 may be configured for computing a computed desired target position 160 for the piston 70 that corresponds to the desired stabilizer wheel position input PD by using a computation process stored in the data storage device 170, or programmed into the processor 156, and generating the new cylinder control signal 118 using the computed desired target position 160 for the piston 70. In some embodiments of the invention, the processor 156 may be configured for making an incremental adjustment to a previously determined target position 160 for the piston 70 in the cylinder bore 68.

For embodiments using the target position 160 of the piston 70, the processor 156 may also use the present position signal 161 as determined by the integral position sensor 103, to determine and utilize a difference ΔPP (delta piston position) between the target and present positions 160,161 of the piston 70 that is equivalent to the difference ΔP between the desired and present positions DP,PP for carrying out the steps of the process 180. The processor 156 may also be configured for generating the target and present positions 160,161 of the piston 70 using one or more look-up tables or computation processes in the manner described above, for embodiments of the invention that utilize another position sensing approach such as the sensor 102.

As indicated at blocks 194 and 196 of FIG. 8, for some embodiments of the invention it may be necessary to modify the new cylinder control signal 118 to compensate various non-linearities in the control system, in order to achieve a desirably high degree of accuracy and precision in positioning and controlling the stabilizer wheel 46.

Figure 9:
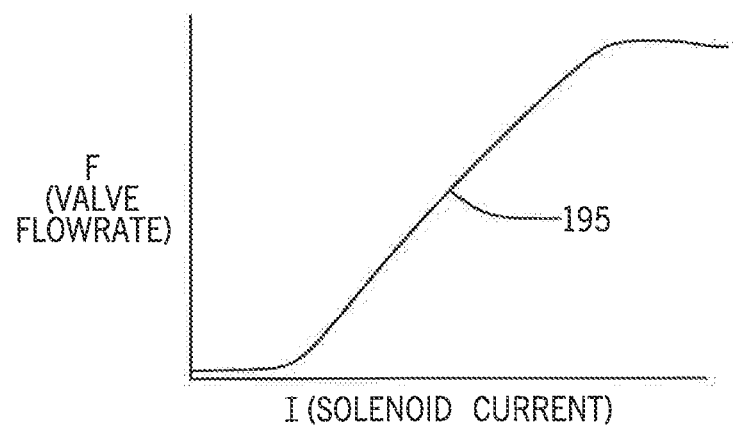
FIGS. 9 and 10 are graphs used to illustrate a methodology for dealing with non-linearities of a remotely controllable stabilizer wheel arrangement, in accordance with an exemplary embodiment of the present invention.
Figure 10:
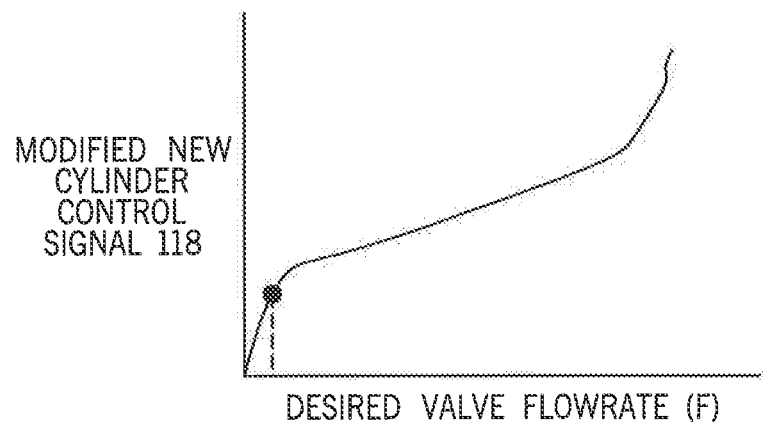

For example, as indicated in FIG. 9, some types of solenoid-operated proportional flow control valves 124 of the type potentially usable for practicing the invention exhibit an inherent non-linearity of flow rate (F) as a function of the current (I) applied by the cylinder control signal 118 to the solenoid(s) 133 at high and low values of current I. To compensate for this inherent non-linearity, it may be necessary for the controller 100 to increase the current level I of the cylinder control signal 118 at low desired flow rates F, and to decrease the current level I of the cylinder control signal 118 at high desired flow rates F, in the manner illustrated in FIG. 10.

Returning to FIG. 8, the processor 156 of the exemplary embodiment is configured to check the new cylinder control signal 118 generated at block 192 to verify that the current level I of the new signal 118 falls within a substantially linear center section 195 of the curve shown in FIG. 9. If the current I corresponding to the new cylinder control signal 118 falls within the linear section 195 of the curve of FIG. 9, the process 180 continues to block 198 and the new cylinder control signal 118 determined at block 192 is sent to the electro-hydraulic control arrangement 104. If, however, the current I corresponding to the new cylinder control signal 118, as determined at block 192, falls outside of the linear section 195 of the curve of FIG. 9, the process 180 continues to block 196 and the new cylinder control signal 118 determined at block 192 is modified in the manner described above with reference to FIG. 10, before being sent to the electro-hydraulic control arrangement 104 as indicated at block 198.

The steps of blocks 194 and 196 may be carried out by the processor 100 and/or the output signal conditioning interface 172 using data stored in the data storage device 170, or computation processes programmed into the processor 100 and/or the output signal conditioning interface 172.

The controller 100 of the exemplary embodiment is configured for continually repeating the method 180 and sampling the present difference ΔP between the target and present positions 160,161 of the piston 70 within the bore 68 of the cylinder 42 at a periodic rate, such as two thousand hertz, for example, and commanding the proportional control valve 124 to simultaneously and cooperatively adjust the flow of pressurized hydraulic fluid to and from both the rod and base ends 72,74 of the bore 68 of the hydraulic cylinder 42 at the periodic rate.

It will be appreciated that, by utilizing such a high repetition rate for sampling, in addition to the using the proportional control methodology described herein, a remotely positionable stabilizer wheel arrangement 12 according to the invention provides highly stable, accurate, precise and responsive control of the position 78 of a stabilizer wheel 46 with respect to the frame 16 of an agricultural implement such as the disk 10.

Those having skill in the art will also appreciate that, through practice of the invention, the stabilizer wheel 46 can be remotely positioned, repositioned, and actively controlled with considerably greater accuracy and precision, and with improved functionality and performance of the stabilizer wheel 46, as compared to prior approaches for positioning such stabilizer wheels.

Specifically, the invention provides for controlling the position 78 of the stabilizer wheel 46 in increments on the order of one-tenth of an inch per each tap of an operator's finger on an incremental adjustment feature of the touchscreen 101. The invention also is sensitive enough to detect and respond to movements of the piston 70 away from the target position 160 on the order of fifty-thousandths of an inch, thereby resulting in highly accurate and precise control of the position 78 of the stabilizer wheel 46 with respect to the frame 16.

It will be further appreciated that the exemplary embodiment of the invention illustrates a method and apparatus for remotely controlling the positioning 78 of a stabilizer wheel 46 independently from the action of the depth control arrangement 82 in positioning the main transport and outer carrying wheels 22,22,23,23 of the disk 10. This allows the remotely adjustable stabilizer wheel arrangement 12 to compensate for the fact that the stabilizer wheel 46 will generally be in contact with an untilled area of the ground surface 80 ahead of the tillage tools 19,20, whereas the support wheels 22,22,23,23 will generally be riding on an area of the ground surface 80 that has been least partly tilled, and may therefore be at a different position 79, with respect to the frame 16 of the disk 10 than the position 78 of the stabilizer wheel 46, with respect to the frame 16, as the stabilizer wheel 46 rides upon the untilled area of the ground surface 80. The present invention allows precise, active control of the stabilizer wheel position 78 during operation of the disk 10 to compensate for this difference in height between the tilled and untilled areas of the ground surface.

Although the exemplary embodiments described herein and shown in the drawings are directed to an embodiment of a disk 10 including two remotely positionable stabilizer wheel arrangements 12,12 in which the second end 32 of the support strut 28 and support bracket 24 are configured for slidable engagement of the support strut 28 with the support bracket 24, and the position sensor 102 is operatively connected for indicating a present linear position of the strut 28 with respect to the strut bracket 24, those having skill in the art will appreciate that, in other embodiments of the invention other configurations and connections of the components may be utilized with efficacy. For example, in other embodiments the strut 28 may be pivotably connected to the support strut bracket 24, and the present position of the strut 28 and/or stabilizer wheel 46 may be detected by other types of position sensing apparatus or methods.

In addition, although the exemplary embodiments described above have utilized a solely proportional control methodology, it will be understood that the invention is not limited to the use of a "proportional only" control methodology. Other embodiments of the invention may use integral and/or differential control methodologies in addition to proportional control. It will be appreciated by those having skill in the art, however, that the combination of various aspects of the invention as described above with reference to the exemplary embodiments has been shown to provide a sufficiently high degree of accuracy, precision and responsiveness in the desired application without the necessity for incorporating more complex control methodologies.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may be apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but that it is intended to include all changes and modifications that are within the scope and spirit of the invention.

What is claimed is:

1. A remotely positionable stabilizer wheel arrangement for an agricultural tillage implement having an implement frame supported above a ground surface by implement support wheels operatively connected to the frame by a depth control arrangement, the remotely positionable stabilizer wheel arrangement comprising:

a stabilizer wheel adapted for engaging the ground surface;

a stabilizer wheel positioning arrangement adapted for operatively connecting the stabilizer wheel to the frame;

the stabilizer wheel positioning arrangement including a double-acting hydraulic cylinder, and being configured for adjusting engagement of the stabilizer wheel with the ground surface through action of the double-acting hydraulic cylinder;

a position sensor operatively connected for indicating a present position of the stabilizer wheel with respect to the frame, and generating an electrical present position signal indicative of the present stabilizer wheel position with respect to the frame;

the double-acting hydraulic cylinder of the stabilizer wheel positioning arrangement having an internal bore divided by a piston into a base end and a rod end of the internal bore, the double-acting hydraulic cylinder also having first and second ends thereof operatively attached within the stabilizer wheel positioning arrangement for extension and retraction of the stabilizer wheel positioning arrangement with respect to the frame by corresponding movement of the piston within the internal bore of the double-acting hydraulic cylinder to thereby position the stabilizer wheel with respect to the frame;

an electro-hydraulic proportional flow control arrangement adapted for receiving a cylinder control electrical signal, and further adapted for operative connection in fluid communication with a source of pressurized hydraulic fluid for receiving a flow of pressurized hydraulic fluid from the source;

the electro-hydraulic proportional flow control arrangement including a solenoid-operated proportional flow control valve operatively connected in fluid communication with both the base end and the rod end of the internal bore of the double-acting hydraulic cylinder and configured for simultaneously and cooperatively controlling the flow of hydraulic fluid to and from both the rod and base ends of the internal bore of the double-acting hydraulic cylinder, to thereby control extension and retraction of the double-acting hydraulic cylinder in accordance with the cylinder control signal; and an electrical controller adapted for receiving an input signal indicating a desired position of the stabilizer wheel with respect to the frame;

the electric controller being further adapted, operatively connected to the position sensor and the solenoid-operated proportional flow control valve, and configured for receiving the present position signal from the position sensor and for generating and providing the cylinder control signal to the solenoid-operated proportional flow control valve in response to the present position signal and the desired wheel position signal, to thereby cause the double-acting hydraulic cylinder to move the stabilizer wheel to and hold the stabilizer wheel at the desired stabilizer wheel position by simultaneously, cooperatively and proportionally controlling the flow of pressurized hydraulic fluid to and from both the rod and base ends of the internal bore of the double-acting hydraulic cylinder;

wherein the electrical controller and positon sensor are opertatively connected and configured to form a proportional negative feedback control arrangement for determining a present difference between the desired and present positions of the stabilizer wheel and adjusting the flow of hydraulic fluid to and from the rod and cylinder ends of the internal bore of the double-acting hydraulic cylinder in proportion to the determined present difference between the desired and present positons of the stabilizer wheel to reduce the present difference.

2. The remotely positionable stabilizer wheel arrangement of claim 1, wherein the electrical controller samples the present difference between the desired and present positions of the stabilizer wheel at a periodic rate and commands the solenoid-operated flow control valve to simultaneously and cooperatively adjust the flow of pressurized hydraulic fluid to and from both the rod and base ends of the internal bore of the double-acting hydraulic cylinder at the periodic rate.

3. The remotely positionable stabilizer wheel arrangement of claim 1 wherein the electrical controller is further configured for modifying the cylinder control signal, prior to sending it to an electro-hydraulic flow proportional control arrangement to compensate for non-linearity of the solenoid-operated proportional flow control valve.

4. The remotely positionable stabilizer wheel arrangement of claim 1, wherein:
the position sensor is operatively connected for indicating a present position of the piston within the cylinder bore that corresponds to the present position of the stabilizer wheel with respect to the frame, and configured for generating an electrical signal indicative of the present position of the piston within the cylinder bore; and
the electrical controller is configured for determining a target position of the piston within the cylinder bore corresponding to the desired wheel position input signal, and for determining a present difference between the target and present positions of the piston and adjusting the flow of hydraulic fluid to and from the rod and cylinder ends of the internal bore of the double-acting hydraulic cylinder in proportion to the determined present difference between the target and present positions of the piston in the cylinder bore to reduce the present difference.

5. The remotely positionable stabilizer wheel arrangement of claim 4, wherein the electrical controller samples the present difference between the target and present positions of the piston within the internal bore of the double-acting hydraulic cylinder at a periodic rate and commands a proportional control valve to simultaneously and cooperatively adjust the flow of pressurized hydraulic fluid to and from both the rod and base ends of the internal bore of the double-acting hydraulic cylinder at the periodic rate.

6. The remotely positionable stabilizer wheel arrangement of claim 4, wherein the electrical controller is configured for determining the target position of the piston within the cylinder bore by at least one step from the group of the steps consisting of:

selecting a predetermined target position for the piston corresponding to the desired stabilizer wheel position input from a table stored in the electrical controller and controlling the hydraulic control arrangement using the predetermined piston target position;

computing a computed desired target position for the piston corresponding to the desired stabilizer wheel position input and controlling the hydraulic control arrangement using the computed desired target position for the piston; and making an incremental adjustment to a previously determined target position for the piston in the cylinder bore.

7. The remotely positionable stabilizer wheel arrangement of claim 1, wherein:
the solenoid-operated proportional flow control valve includes an inlet port, a return port, a first cylinder port and a second cylinder port, and at least one electrical solenoid operatively connected to the electrical controller for receiving the cylinder control signal and controlling a flow of pressurized hydraulic fluid through the solenoid-operated proportional flow control valve in accordance with the cylinder control signal;

the inlet and outlet ports being adapted for operative connection in fluid communication to the source of pressurized hydraulic fluid for respectively receiving a flow of pressurized hydraulic fluid from the source of pressurized hydraulic fluid and returning the flow of pressurized hydraulic fluid to the source of pressurized hydraulic fluid; and the first and second cylinder ports being operatively connected in fluid communication with the base and rod ends respectively of the double-acting hydraulic cylinder.

8. The remotely positionable stabilizer wheel arrangement of claim 7, wherein the solenoid-operated proportional flow control valve is a four-way, three-position, solenoid-controlled valve having a straight-through-flow first position, a blocked-flow second position, and a cross-flow third position that are alternatively selectable by operation of the at least one electrical solenoid.

9. The remotely positionable stabilizer wheel arrangement of claim 7, wherein the electro-hydraulic proportional flow control arrangement further includes a pilot-operated check valve arrangement operatively connected in fluid communication across the rod and base ends of the double-acting hydraulic cylinder at a location between the double-acting hydraulic cylinder and the solenoid-operated proportional flow control valve.

10. The remotely positionable stabilizer wheel arrangement of claim 7, wherein the electro-hydraulic proportional flow control arrangement further includes a pressure-sensitive control valve operatively connected in fluid communication across the inlet ports of the solenoid-operated proportional flow control valve at a location between the solenoid-operated proportional flow control valve and the source of hydraulic fluid, and configured for providing a constant flow rate of hydraulic fluid to the solenoid-operated proportional flow control valve at varying pressure differences between the inlet and outlet ports.

11. An agricultural tillage implement having an implement frame supported above a ground surface by implement support wheels operatively connected to the frame by a depth control arrangement, further having an at least one remotely positionable stabilizer wheel arrangement attached to the frame, the at least one remotely positionable stabilizer wheel arrangement comprising:

a stabilizer wheel adapted for engaging the ground surface;

a stabilizer wheel positioning arrangement adapted for operatively connecting the stabilizer wheel to the frame;

the stabilizer wheel positioning arrangement including a double-acting hydraulic cylinder, and being configured for adjusting engagement of the stabilizer wheel with the ground surface through action of the double-acting hydraulic cylinder;

a position sensor operatively connected for indicating a present position of the stabilizer wheel with respect to the frame, and generating an electrical present position signal indicative of the present stabilizer wheel position with respect to the frame;

the double-acting hydraulic cylinder of the stabilizer wheel positioning arrangement having an internal bore divided by a piston into a base end and a rod end of the internal bore, the double-acting hydraulic cylinder also having first and second ends thereof operatively attached within the stabilizer wheel positioning arrangement for extension and retraction of the stabilizer wheel positioning arrangement with respect to the frame by corresponding movement of the piston within the internal bore of the double-acting hydraulic cylinder to thereby position the stabilizer wheel with respect to the frame;

an electro-hydraulic proportional flow control arrangement adapted for receiving a cylinder control electrical signal, and further adapted for operative connection in fluid communication with a source of pressurized hydraulic fluid for receiving a flow of pressurized hydraulic fluid from the source;

the electro-hydraulic proportional flow control arrangement including a solenoid-operated proportional flow control valve operatively connected in fluid communication with both the base end and the rod end of the internal bore of the double-acting hydraulic cylinder and configured for simultaneously and cooperatively controlling the flow of hydraulic fluid to and from both the rod and base ends of the internal bore of the double-acting hydraulic cylinder, to thereby control extension and retraction of the double-acting hydraulic cylinder in accordance with the cylinder control signal; and an electrical controller adapted for receiving an input signal indicating a desired position of the stabilizer wheel with respect to the frame;

the electrical controller being further adapted, operatively connected to the position sensor and the solenoid-operated proportional flow control valve, and configured for receiving the present position signal from the position sensor and for generating and providing the cylinder control signal to the solenoid-operated proportional flow control valve in response to the present position signal and the desired wheel position signal, to thereby cause the double-acting hydraulic cylinder to move the stabilizer wheel to and hold the stabilizer wheel at the desired stabilizer wheel position by simultaneously, cooperatively and proportionally controlling the flow of pressurized hydraulic fluid to and from both the rod and base ends of the internal bore of the double-acting hydraulic cylinder;

wherein:

the electrical controller and position sensor are operatively connected and configured to form a proportional negative feedback control arrangement for determining a present difference between the desired and present positions of the stabilizer wheel and adjusting the flow of hydraulic fluid to and from the rod and cylinder ends of the internal bore of the double-acting hydraulic cylinder in proportion to the determined present difference between the desired and present positions of the stabilizer wheel;

the position sensor is further operatively connected for indicating a present position of the piston within the cylinder bore that corresponds to a present position of the stabilizer wheel with respect to the frame, the position sensor also being configured for generating an electrical signal indicative of the present position of the piston within the cylinder bore;

the electrical controller is configured for determining a target position of the piston within the cylinder bore corresponding to the desired wheel position input signal, and for determining a present difference between the target and present positions of the piston within the cylinder bore and adjusting the flow of hydraulic fluid to and from the rod and cylinder ends of the internal bore of the double-acting hydraulic cylinder in proportion to the determined present difference between the target and present positions of the piston in the cylinder bore to move and hold the piston at the target position for the piston within the cylinder bore; and the electrical controller is configured to repetitively sample the present difference between the target and present positions of the piston within the internal bore of the double-acting hydraulic cylinder at a periodic rate, and to command a proportional control valve to simultaneously and cooperatively adjust the flow of pressurized hydraulic fluid to and from both the rod base ends of the internal bore of the double-acting hydraulic cylinder at the periodic rate.

12. The agricultural tillage implement of claim 11, wherein s position of at least one of the at least one remotely positionable stabilizer wheel arrangement with respect to the frame of the implement is proportionally adjustable independently from the position of the implement support wheels and the depth control arrangement.

13. The agricultural tillage implement of claim 12, including at least one additional remotely positionable stabilizer wheel arrangement operatively attached to the frame and configured for proportional adjustment independently from the at least one remotely positionable stabilizer wheel arrangement.

14. The agricultural tillage implement of claim 5, wherein the electrical controller is configured for determining the target position of the piston within the cylinder bore by at least one step from the group of the steps consisting of:

selecting a predetermined target position for the piston corresponding to the desired stabilizer wheel position input from a table stored in the electrical controller and controlling the hydraulic control arrangement using the predetermined piston target position;

computing a computed desired target position for the piston corresponding to the desired stabilizer wheel position input and controlling the hydraulic control arrangement using the computed desired target position for the piston; and making an incremental adjustment to a previously determined target position for the piston in the cylinder bore.

15. A method for remotely positioning a stabilizer wheel of an agricultural tillage implement having an implement frame supported above a ground surface by implement support wheels operatively connected to the frame by a depth control arrangement, in accordance with a desired position of the stabilizer wheel with respect to the frame, the method comprising:
  operatively connecting the stabilizer wheel to the frame with a stabilizer wheel positioning arrangement including a double-acting hydraulic cylinder having an internal cylinder bore divided by a piston into a base end and a rod end of the internal bore, the double-acting hydraulic cylinder also having first and second ends thereof operatively attached within the stabilizer wheel positioning arrangement for extension and retraction of the stabilizer wheel positioning arrangement with respect to the frame by corresponding movement of the piston within the internal bore of the double-acting hydraulic cylinder to thereby position the stabilizer wheel with respect to the frame;
  determining a target position for the piston within the cylinder bore that corresponds to the desired position of the stabilizer wheel with respect to the frame; and
  simultaneously, cooperatively and proportionally controlling the flow of hydraulic fluid to and from both the rod and base ends of the internal bore of the double-acting hydraulic cylinder to thereby control extension and retraction of the double-acting hydraulic cylinder for moving the stabilizer wheel to, and holding the stabilizer wheel at, the desired stabilizer wheel position;
  determining a present position of the piston within the cylinder bore;
  determining a present difference between the target and present positions of the piston within the cylinder bore; and
  adjusting the flow of hydraulic fluid and to form the rod and cylinder ends of the internal bore of the double-acting hydraulic cylinder in proportion to the determined present difference between the target and present positions of the piston in the cylinder bore to move and hold the piston at the target position for the piston within the cylinder bore.

16. The method of claim 15, further comprising determining the target position of the piston within the cylinder bore by at least one step from the group of the steps consisting of:
  selecting a predetermined target position for the piston corresponding to the desired stabilizer wheel position input from a table and controlling the hydraulic control arrangement using the predetermined piston target position;
  computing a computed desired target position for the piston corresponding to the desired stabilizer wheel position input and controlling the hydraulic control arrangement using the computed desired target position for the piston; and
  making an incremental adjustment to a previously determined target position for the piston in the cylinder bore.

\* \* \* \* \*